United States Patent [19]

Sulzbacher et al.

[11] 4,376,139

[45] Mar. 8, 1983

[54] PROCESS FOR TREATING METALLIC STARTING MATERIALS FOR SMELTING PLANTS, PARTICULARLY IRON SPONGE PARTICLES

[75] Inventors: Horst Sulzbacher, Leoben; Günther Saiger, Trofaiach; Kurt Stift, Leoben, all of Austria

[73] Assignee: Voest-Alpine Aktiengesellschaft, Vienna, Austria

[21] Appl. No.: 267,620

[22] Filed: May 27, 1981

[30] Foreign Application Priority Data

Jun. 11, 1980 [AT] Austria .................................. 3080/80

[51] Int. Cl.$^3$ .............................................. B05D 7/00
[52] U.S. Cl. .................................... 427/214; 427/216; 75/256; 75/3
[58] Field of Search ........................ 75/11, 0.5 R, 256; 427/214, 217, 216

[56] References Cited

U.S. PATENT DOCUMENTS

| | | | |
|---|---|---|---|
| 3,690,930 | 9/1972 | Mueller | 427/216 |
| 4,075,370 | 2/1978 | Burlengam | 427/216 |
| 4,254,167 | 3/1981 | Sulzbecher | 427/216 |
| 4,290,800 | 9/1981 | Sensis | 75/11 |

*Primary Examiner*—Sam Silverberg
*Attorney, Agent, or Firm*—Cushman, Darby & Cushman

[57] ABSTRACT

For protecting iron sponge particles against reoxidation and/or corrosion a coating comprising CaO as well as iron or iron oxides as adhesion promotor is applied onto the iron sponge particles. Water is subsequently sprayed onto this coating whereupon a second coating of a mixture of dust-shaped CaO and a carbon carrier is applied. This second coating is subsequently humidified with a smaller amount of water than would be necessary for completely slaking the CaO contained within the second coating.

12 Claims, No Drawings

PROCESS FOR TREATING METALLIC STARTING MATERIALS FOR SMELTING PLANTS, PARTICULARLY IRON SPONGE PARTICLES

The invention refers to a process for treating metallic starting materials for smelting plants, particularly iron sponge particles, for the purpose of protecting the particles against reoxidation and/or against corrosion as well as for the purpose of improving the melting characteristics of said particles, said process comprising applying on the iron sponge particles a coating of CaO as well as iron or iron oxides as an adhesion promoter and then spraying water onto said coating. From the Austrian Patent Specification 350 600 there has become known a process for treating iron sponge for protecting the iron sponge against reoxidation. The iron sponge used in this process is, as a rule, produced by direct reduction of iron ores by means of a reduction gas in a rotary kiln or in a vertical kiln. The reduction gas consists in most cases of hydrogen and carbon monoxide and reduces the iron oxide to metallic iron. The known process for increasing the oxidation stability of such particles during transport and storage essentially consists in that the particles are, subsequently to the iron sponge production, drummed in a mixture of lime (calcined lime stone) and additives improving the adhesiveness such as iron and iron oxide, in particular $Fe_2O_3$ and $Fe_3O_4$. Subsequently, the iron sponge particles are humidified with water and agitated in lime. By subsequently partially slaking the lime, swelling of the surface layer of the iron sponge particles is, in combination with the iron dust, achieved, thus simultaneously giving rise to the formation of a protecting magnetite layer on the surface of the iron sponge on account of the heat of hydration generated and of the oxygen still present. The iron sponge particles having been passivated according to this process shown an excellent resistance against reoxidation.

It is now an object of the invention to further develop the process initially mentioned such that beside a protection against reoxidation also an additional improvement of the smelting characteristics of the particles is obtained. For solving this task, the invention essentially consists in that a second coating consisting of dust-shaped CaO and a carbon source, particularly coal dust such as brown coal dust, bituminous coal dust or anthracite dust, hydrocarbons or the like and, if desired, of iron oxides as well as, if desired, of alloying elements is applied in a further process step onto the coating essentially consisting of hydrated CaO and in that the second coating is humidified with a smaller amount of water than would be required for completely hydrating the CaO contained within the second coating. In view of applying onto the first coating layer a second coating consisting of a mixture of dust-shaped CaO and a carbon source, a product is obtained by means of which not only additional energy carriers are introduced into the melting process but by means of which also substantial advantages can be obtained with respect to carburizing the bath. When simultaneously melting iron sponge and scrap, the iron sponge reduces the high void volume of the scrap thus increasing its bulk weight and the melting capacity. The coated iron sponge particles cannot become reoxidized in view of being enclosed within a shell of reducing property on account of its carbon content. During the melting operation there is first formed carbon monoxide which is burnt to $CO_2$ within the furnace space by the oxygen so that the scrap and also the furnace receptacle becomes more rapidly heated and thus the melting capacity is increased.

When carburizing a melt in usual manner, carbon is applied onto the clean melt or already charged together with the scrap, respectively. With such processes the carbon can become partially burnt and the proportion can amount up to 50 percent. The equally known addition of solid carbon onto the slag surface results in stiffening the slag so that the metal bath will, in view of the low specific weight of carbon, scarcely be contacted with the carbon added and scarcely be carburized. If, however, the carbon is introduced as an integrated component of the iron sponge particles, the carbon penetrates the slag layer and enters the metal path together with these particles when suitable slag compositions and refining conditions are observed. The carbon portion contained within the coating enters thus the bath to a high extent and the desired final carbon content can be obtained by adding iron sponge particles containing carbon. In view of the particles used having the carbon source within the outermost layer, the content of the slag in FeO can be reduced because the iron sponge sinking through the slag in downward direction into the bath is reducing on account of its carbon content the iron oxide contained within the slag. In this manner the output can be increased. In view of the carbon content representing an additional energy carrier, the amount of solid charge material, particularly the amount of iron sponge particles comprising a coating according to the invention and the amount of scrap, can be increased and this in particular in an oxygen refining process in which oxygen is blown onto the bath. In view of the first coating already providing a good protection against reoxidation it is, without further, possible to incorporate into the second coating any desired alloying components, noting that, above all, fine-grained alloying metals or oxides and carbides of such alloying metals can be used. The subsequent partial hydration of the coating results in permanently embedding of these alloying components and provides the possiblitiy to obtain the desired content in alloying components with high precision. For this purpose, the coating is, after applying the second coating, preferably humidified with a smaller amount of water as would be required for the complete hydration of the CaO contained within the second coating.

According to a preferred further development of the process according to the invention, the CaO of the first coating is substantially completely hydrated, preferably hydrated to an extent of 80 to 100 percent, thus improving adhesion and bonding of the second coating. The first coating provides a protection against reoxidation and serves also as a base layer improving the agglomeration characteristics when forming the second coating. In view of the carbon carrier only being applied with the second coating, any direct contact between the carbon carrier and the metallized product and thus any negative influence on the resistance against reoxidation is avoided.

When melting iron sponge in an electric arc, a refining period is in most cases omitted in view of the sulphur content of the steel being very low. For this reason it is favourable to begin with the alloying operation of the steel during the boiling period and to finish alloying operation within the ladle. The raw materials for the pre-alloying operation are fine-grained alloying metals obtained as by-products or oxides of alloying elements becoming directly reduced within the electric arc by the admixed carbon carrier. By homogenously distributing the alloying material over the iron sponge charged, a uniform steel composition can more reliably be obtained.

The process according to the invention is preferably performed such that the carbon carrier is incorporated within the second coating in an amount resulting, based on the weight of the iron sponge particles, in a carbon content of 1 to 20 percent by weight, particularly of 3 to 5 percent by weight. With such content in carbon carriers, the most favourable results are obtained during the melting operation. Beside brown coal dust, bituminous coal dust or anthracite coal dust, there can, above all, be used as carbon carrier naphta and products derived therefrom, in particular hydrocarbons. A particularly preferred carbon carrier to be used in the process according to the invention is coal dust, because coal dust results in the lowest possible environmental contamination and in the smallest danger of introducing undesired elements. As a rule, a maximum content of 10 percent by weight carbon is sufficient. Higher carbon contents do not contribute anymore to the melting characteristics.

Preferably also the mixture for the second coating is added with iron oxide dust, particularly $Fe_2O_3$ and $Fe_3O_4$, in an amount of 1 to 20 percent by weight of the mixture, preferably up to 10 percent by weight of the mixture, thus increasing the adhesion of the second coating on the first coating. In this case, the particles carrying the first coating can in a simple manner be introduced into a humidified mixture of CaO, iron oxides and/or alloying components as well as of the carbon carrier. For minimizing any danger of reoxidation also over prolonged storage periods, the wet mixture for the second coating is preferably hydrated to a maximum extent of approximately 85 percent, preferably to an extent between 50 and 75 percent. In any case, the iron spone particles used have a grain size of at least 2 mm, thereby particularly selecting a grain size of at least 4 mm.

According to an advantageous embodiment the sum of the amounts of both coatings is, based on the weight of the iron sponge particles, selected with about 5 to 25 percent by weight, preferably 6 to 20 percent by weight, thereby applying the second coating in an amount of 2 to 20 percent by weight, preferably 5 to 15 percent by weight, based on the weight of the iron sponge particles. In any case, it appears advantageous to apply the second coating in an amount exceeding the weight of the first coating. In this manner, the desired contents in carbon, based on the weight of the iron sponge particles, can reliably be obtained. In a preferred manner, the coating material used for the second coating contains 20 to 40 percent by weight, preferably 30 percent by weight CaO and 60 to 80 percent by weight, preferably 70 percent by weight of the solid carbon carrier.

The invention is further illustrated with reference to the following examples.

EXAMPLE 1

Within an electric arc furnace (600 KVA) of 1 metric ton capacity there was molten, on the one hand, non-coated directly reduced iron and, on the other hand, for the purpose of comparison a material of equal starting quality but treated with coke and coal dust. In both cases the degree of metallisation was approximately 84 percent.

|  | Analysis of non-coated directly reduced iron | analysis of coated directly reduced iron |
|---|---|---|
| Fe metallic | 74.4% | 69.1% |
| Fe total | 88.9% | 82.8% |
| degree of metallisation | 83.7% | 83.5% |
| C | 1.6% | 4.8% |
| CaO | 0.1% | 3.1% |
| $SiO_2$ | 1.7% | 1.6% |
| $Al_2O_3$ | 0.7% | 0.6% |
| MgO | 0.4% | 0.3% |
| $H_2O$ | 2.3% | 1.6% |
| $CaO/SiO_2$ | 0.06 | 1.9 |

The ratio between the amount of scrap and the amount of iron sponge was selected with approximately 1:2 (375 kg scrap, 975 kg iron sponge). After having molten the scrap, the iron sponge was continuously charged with a speed of addition allowing complete melting of the iron sponge added. The results obtained with the test heats are compared in the following table

|  | results of melting operation | | |
|---|---|---|---|
|  | non-coated directly reduced iron | coated directly reduced iron | economy in percent |
| energy consumption for melting scrap | 72 KWh/ 100 kg | 75 KWh/ 100 kg | −3 |
| energy consumption for melting directly reduced iron | 125 KWh/ 100 Kg | 97 KWh/ 100 kg | +22 |
| carburizing agent | 7.8 kg | — | +100 |
| carbon content within the bath after melting the directly reduced iron | 0.07% | 0.18% |  |
| content of FeO within the slag | 41.2% | 12.2% |  |
| amount of slag | 141 kg | 97 kg | +31 |
| iron losses within the slag | 58.1 kg | 11.8 kg | +80 |
| total melting time | 2.74 h | 2.28 h | +17 |

EXAMPLE 2

The metallic fines obtained on comminuting ferrechromium of high carbon content were ground to a particle size of 200 μm and then mixed with lime and coke dust in a ratio of 50 percent ferro-chromium, 20 percent coke dust and 30 percent CaO.

This mixture was used for coating iron sponge. After the coating operation and after a certain storage time the analysis of the iron sponge, in percent, was as follows

| Fe total | 87.2 |
|---|---|
| Fe metallic | 81.6 |
| degree of metallisation | 93.6 |
| C | 2.5 |
| Cr | 2.2 |
| CaO | 2.3 |
| MgO | 0.6 |
| $SiO_2$ | 1.8 |
| $Al_2O_3$ | 0.5 |
| $H_2O$ | 0.9 |

Melting tests performed in a laboratory scale were made with this material within an induction furnace, thereby obtaining a high output in chromium.

In a typical manner the final carbon content and the content in CaO of the drummed material was 4.4 percent by weight and 2.8 percent by weight, respectively, when using a mixture of 30 percent lime and 70 percent solid carbon carrier for the second coating of the iron sponge.

In principle, the amount of coating material is delimited in direction to higher amounts only by the fact that the strength of the adhering coating becomes still worse with increasing thickness of the coating. In a test performed with the object to obtain a maximum thickness of the layer the following values for the composition were, after drumming operation, found when using for the second coating a coating material consisting of 80 percent coke dust and 20 percent CaO

| | |
|---|---|
| CaO | 6.28% |
| C | 18.5% |

What is claimed is:

1. Process for treating metallic starting materials for smelting plants, particularly iron sponge particles, for the purpose of protecting the particles against reoxidation and/or against corrosion as well as for the purpose of improving the melting characteristics of said particles, said process comprising applying on the iron sponge particles a coating of CaO as well as iron or iron oxides as an adhesion promoter and then spraying water onto said coating, characterized in that a second coating consisting of dust-shaped CaO and a carbon source, particularly coal dust such as brown coal dust, bituminous coal dust or anthracite dust, hydrocarbons or the like and, if desired, of iron oxides as well as, if desired, of alloying elements is applied in a further process step onto the coating essentially consisting of hydrated CaO and in that the second coating is humidified with a smaller amount of water than would be required for completely hydrating the CaO contained within the second coating.

2. Process as claimed in claim 1, characterized in that the first coating is added with such an amount of water which results in an hydration to an extent of 80 to 100 percent of the CaO contained in the first coating.

3. Process as claimed in claim 1 or 2, characterized in that the carbon carrier is introduced into the second coating in an amount which results, based on the weight of the iron sponge particles, in a carbon content of 1 to 10 percent by weight, particularly 3 to 5 percent by weight.

4. Process as claimed in claim 1 or 2, characterized in that alloying components are added to the mixture for the second coating in the form of fine-grained metals or dust-shaped oxides and carbides, in particular of Mn, Si, Mo, V and Cr.

5. Process as claimed in claim 1 or 2, characterized in that iron oxide dust, particularly $Fe_2O_3$ and $Fe_3O_4$ in amounts of 1 to 20 percent and preferably in an amount up to 10 percent of the mixture, is introduced into the mixture for the second coating.

6. Process as claimed in claim 1 or 2, characterized in that the particles carrying the first coating are introduced into a humidified mixture of CaO, iron oxides and/or alloying components and of the carbon carrier.

7. Process as claimed in claim 6, characterized in that the wet mixture for the second coating is hydrated to a maximum extent of approximately 85 percent, preferably to an extent between 50 and 75 percent.

8. Process as claimed in claim 1 or 2, characterized in that iron sponge particles are used which have a particle size of at least 2 mm.

9. Process as claimed in claim 1 or 2, characterized in that the second coating is applied in an amount exceeding the weight of the first coating.

10. Process as claimed in claim 1 or 2, characterized in that the sum of the amounts of said both coatings is, based on the weight of the iron sponge particles, selected with approximately 5 to 25 percent by weight, preferably 6 to 20 percent by weight.

11. Process as claimed in claim 1 or 2, characterized in that the second coating is, based on the weight of the iron sponge particles, applied in an amount of 2 to 20 percent by weight, preferably 5 to 15 percent by weight.

12. Process as claimed in claim 1 or 2, characterized in that the coating material for the second coating contains 20 to 40 percent by weight and preferably 30 percent by weight CaO and 60 to 80 percent by weight and preferably 70 percent by weight solid carbon carrier.

* * * * *